United States Patent
Goedert et al.

(10) Patent No.: US 9,333,878 B2
(45) Date of Patent: May 10, 2016

(54) VEHICLE SEAT SUSPENSION MAT

(71) Applicant: IEE INTERNATIONAL ELECTRONICS & ENGINEERING S.A., Echternach (LU)

(72) Inventors: Guenter Goedert, Trier (DE); Werner Bieck, Wiltingen (DE)

(73) Assignee: IEE INTERNATIONAL ELECTRONICS & ENGINEERING S.A., Luxembourg (LU)

( * ) Notice: Subject to any disclaimer, the term of this patent is extended or adjusted under 35 U.S.C. 154(b) by 0 days.

(21) Appl. No.: 14/404,267

(22) PCT Filed: May 17, 2013

(86) PCT No.: PCT/EP2013/060227
§ 371 (c)(1),
(2) Date: Nov. 26, 2014

(87) PCT Pub. No.: WO2013/178487
PCT Pub. Date: Dec. 5, 2013

(65) Prior Publication Data
US 2015/0143927 A1    May 28, 2015

(30) Foreign Application Priority Data

May 30, 2012    (LU) .......................................... 92013

(51) Int. Cl.
*G01L 1/04* (2006.01)
*B60N 2/00* (2006.01)
(Continued)

(52) U.S. Cl.
CPC ...... *B60N 2/002* (2013.01); *B60N 2/54* (2013.01); *B60N 2/7094* (2013.01); *B60R 21/01516* (2014.10); *G01L 1/04* (2013.01); *H01H 13/702* (2013.01); *H01H 2211/032* (2013.01)

(58) Field of Classification Search
CPC ...... G01G 19/4142; G01B 21/32; G01B 2/32; G01L 1/04; B60R 21/01516; H01H 2211/032
USPC ............... 73/760, 862.637, 862.639, 862.641
See application file for complete search history.

(56) References Cited

U.S. PATENT DOCUMENTS

| 4,869,554 A | 9/1989 | Abu-Isa |
| 5,013,089 A | 5/1991 | Abu-Isa et al. |

(Continued)

FOREIGN PATENT DOCUMENTS

| DE | 4212018 A1 | 10/1992 |
| DE | 19752976 A1 | 6/1998 |

(Continued)

OTHER PUBLICATIONS

International Search Report and Written Opinion issued Sep. 19, 2013 re: PCT/EP203/060225; citing: EP 2 450 228 A2, JP 49 132105 U, EP 2 450 229 A2 and EP 1 666 311 B1.

(Continued)

*Primary Examiner* — Max Noori
(74) *Attorney, Agent, or Firm* — Cantor Colburn LLP

(57) ABSTRACT

A vehicle seat suspension mat (12) comprises suspension springs (14) for supporting a seat cushion (16) and a pressure sensor module (18) arranged on the springs for being applied against a bottom surface of the seat cushion. The pressure sensor module produces an electrical signal responsive to pressure acting on it. The pressure sensor module comprises a base plate (20) and a film-type pressure sensor (22) arranged on the base plate. The pressure sensor includes a pressure-sensitive cell (36). The base plate comprises a frame (26) and an actuator (28) that is linked to the frame in such a way that it is capable of movement relative to the frame. The actuator is arranged against the pressure-sensitive cell of the film-type pressure sensor and comprises a fixation element (48) fixing the base plate to the springs. The fixation element provides a spacing between the base plate and the springs.

14 Claims, 6 Drawing Sheets

(51) Int. Cl.
*B60N 2/70* (2006.01)
*B60R 21/015* (2006.01)
*B60N 2/54* (2006.01)
*H01H 13/702* (2006.01)

(56) References Cited

U.S. PATENT DOCUMENTS

| | | | |
|---|---|---|---|
| 5,439,271 | A | 8/1995 | Ryan |
| 5,884,977 | A | 3/1999 | Swamy et al. |
| 5,984,349 | A | 11/1999 | Van Voorhies |
| 6,056,079 | A | 5/2000 | Cech et al. |
| 6,070,942 | A | 6/2000 | Barton et al. |
| 6,213,557 | B1 | 4/2001 | Aebischer et al. |
| 6,419,313 | B1 | 7/2002 | Newman |
| 6,719,368 | B1 | 4/2004 | Neale |
| 2002/0062998 | A1* | 5/2002 | Curtis ............... G01G 19/4142 177/144 |
| 2003/0033885 | A1* | 2/2003 | Knox et al. .............. 73/777 |
| 2003/0047974 | A1 | 3/2003 | Tame |
| 2004/0108755 | A1 | 6/2004 | Neale |
| 2004/0124018 | A1* | 7/2004 | Yanagi ............... B60N 2/002 177/144 |
| 2004/0262049 | A1* | 12/2004 | Senoh ............... G01G 19/4142 177/144 |
| 2005/0168046 | A1 | 8/2005 | Hadi et al. |
| 2010/0295563 | A1* | 11/2010 | Bieck et al. ............ 324/679 |
| 2012/0299605 | A1* | 11/2012 | Wakabayashi et al. ....... 324/679 |
| 2014/0246887 | A1* | 9/2014 | Clos ............... B60N 2/002 297/217.3 |
| 2015/0123436 | A1* | 5/2015 | Boyer et al. ............... 297/217.2 |
| 2015/0137569 | A1* | 5/2015 | Goedert ............... 297/217.1 |
| 2015/0143927 | A1* | 5/2015 | Goedert et al. .......... 73/862.641 |

FOREIGN PATENT DOCUMENTS

| | | |
|---|---|---|
| DE | 10145370 A1 | 12/2002 |
| DE | 202010003563 U1 | 8/2010 |
| EP | 1666311 B1 | 1/2009 |
| EP | 2450228 A2 | 5/2012 |
| EP | 2450229 A2 | 5/2012 |
| FR | 2937291 A1 | 4/2010 |
| JP | 49132105 U | 11/1974 |
| WO | 2004089687 A1 | 10/2004 |
| WO | 2012053619 A1 | 4/2012 |

OTHER PUBLICATIONS

International Search Report and Written Opinion issued Sep. 5, 2013 re: PCT/EP2013/060221; citing: WO 2004/089687 A1, DE 101 45 370 A1 and DE 42 12 018 A1.

International Search Report and Written Opinion issued Sep. 5, 2013; re: PCT/EP2013/060227; citing: WO 2012/053619 A1, EP 2 450 228 A2 and FR 2 937 291 A1.

* cited by examiner

VEHICLE SEAT SUSPENSION MAT

TECHNICAL FIELD

The present invention generally relates to the field of vehicle seats. In particular, the invention relates to a vehicle seat suspension mat including a pressure sensor module and to such pressure sensor module itself.

BACKGROUND ART

Seat occupancy sensors are nowadays widely used in automotive vehicles to provide a seat occupancy signal for various appliances, such as, e.g. a seat belt reminder, an auxiliary restraint system (airbag), etc. The possibility of customization and personalization of the vehicle by the customer is a key selling factor of modern cars. This leads to many different variants of car interiors being offered for one car model. With the increasing number of available options, severe constraints arise concerning the implementation of technical equipment in the vehicle. With seat occupancy sensors arranged between the foam body of the seat cushion and the seat cover, every seat design (leather, cloth, sport, comfort, . . . ) requires specific development effort for the occupant detection system. That induces high development costs and is, therefore, an unattractive solution for the automotive industry. Hence, a problem to be solved is to find a sensor solution, which is less influenced by seat design and thus can be used for a greater variety of car seats or even car platforms.

Document DE 197 52 976 A1 discloses a vehicle seat suspension mat, comprising an occupancy sensor in the shape of a film-type pressure sensor. The pressure sensor includes a first carrier film, a spacer and a second carrier film, which are disposed on one another in the manner of a sandwich. Contact elements are arranged on the inner surfaces of the carrier films. An opening in the spacer allows the contact elements to get into contact with each other when pressure is applied on the sensor. The pressure sensor is arranged inside a cavity on the bottom side of the foam cushion of the vehicle seat. The pressure sensor is supported by a foam block, which closes the cavity and which rests on the seat pan.

Document DE 20 2010 003 563 U1 discloses a vehicle seat suspension mat, comprising a film-type pressure sensor. The pressure sensor includes two films maintained at a distance by a spacer material arranged there between. The pressure sensor is disposed on a compressible intermediate layer, which is, in turn arranged on a base plate.

The solutions presented in DE 197 52 976 A1 and DE 20 2010 003 563 U1 use each an intermediate foam layer between the film-type pressure sensor and its support (i.e. the seat pan or the springs of the seat suspension mat) in order to allow the reaction force of the support to compress the film-type sensor from below. The activation threshold of the film-type pressure sensor (i.e. the pressure above with the film-type pressure sensor is activated) may be adjusted by appropriately selecting the compressibility of the intermediate layer.

BRIEF SUMMARY

The disclosure enables more flexible adjustment of the activation threshold of a film-type pressure sensor arranged at the B-surface of a vehicle seat.

A first aspect of the invention concerns a vehicle seat suspension mat that comprises one or more suspension springs for supporting a seat cushion and a pressure sensor module arranged on the one or more suspension springs for being applied against a bottom surface of the seat cushion. The pressure sensor module is configured for producing an electrical signal responsive to pressure acting on the pressure sensor module. The pressure sensor module comprises a base plate and a film-type pressure sensor arranged on the base plate, the film-type pressure sensor including a pressure-sensitive cell. According to the invention, the base plate of the pressure sensor module comprises a frame portion (hereinafter referred to as "frame") and an actuator portion (hereinafter referred to as "actuator"), the actuator being linked to the frame in such a way that the actuator is capable of movement relative to the frame. The actuator is arranged against the pressure-sensitive cell of the film-type pressure sensor and further comprises a fixation element fixing the base plate to the one or more suspension springs. The fixation element is configured to provide a spacing between the base plate and the at least one suspension spring.

The actuator is thus able of (limited) movement perpendicular to the plane of the base plate frame. The base plate is mounted on the one or more suspension springs via the actuator, on the bottom of which the fixation elements are provided for engaging with the one or more suspension springs. When the pressure sensor module is loaded from above, the reaction force of the one or more suspension springs is at first transmitted only via the actuator, which moves the actuator upwards with respect to the frame. This will guide the reaction force from below through the pressure-sensitive cell. Accordingly, the pressure threshold of the pressure sensor module may be adjusted by appropriately tailoring the mechanical properties of the actuator.

A further aspect of the present invention concerns a pressure sensor module for a vehicle seat suspension mat as described above. The pressure sensor module comprising a base plate and a film-type pressure sensor arranged on the base plate. The base plate comprises a frame and an actuator, the actuator being linked to the frame in such a way that the actuator is capable of movement relative to the frame. The pressure sensor includes a pressure-sensitive cell, which the actuator is arranged against. The actuator comprises a fixation element for fixing the base plate on the one or more suspension springs of the vehicle seat suspension mat, the fixation element being configured so as to provide a spacing between the base plate and the at least one suspension spring.

According to a first preferred embodiment of the invention, the actuator is linked to the frame in cantilevered manner.

According to a second preferred embodiment of the invention, the actuator comprises a first and a second end and is linked to the frame at the first and second ends.

According to yet another preferred embodiment of the invention, the actuator is linked to the frame by a plurality of webs.

The actuator and the frame are preferably made of one piece of material, e.g. injection-molded plastic or as a metal profile.

The base plate may comprise one or more spacers arranged at a periphery of the film-type pressure sensor, the one or more spacers defining between them a region into which the seat cushion may penetrate when loaded so as to come to lie against the film-type pressure sensor.

Alternatively or additionally, the pressure sensor module comprises a casing accommodating the film-type pressure sensor in its interior, the casing comprising the base plate as its bottom plate. The casing could be made of a single piece of material, e.g. injection-molded plastic.

The fixation element for fixing the base plate to the one or more suspension springs preferably comprises a clip or a clamp that snap-fits or otherwise engages with the one or more suspension springs.

The film-type pressure sensor preferably comprises a first carrier film and a second carrier film spaced from each other by a spacer film, the spacer film having therein an opening defining the pressure-sensitive cell, the film-type pressure sensor comprising at least two electrodes arranged in facing relationship with each other in the cell on the first and the second carrier film, respectively, in such a way that the at least two electrodes are brought closer together, possibly into contact with each other, when pressure is applied on the film-type pressure sensor.

BRIEF DESCRIPTION OF THE DRAWINGS

Preferred embodiments of the invention will now be described, by way of example, with reference to the accompanying drawings, in which.

It should be noted that the same reference number have been used throughout the drawings to designate the same or similar elements. For the sake of clarity of the drawings, the different elements of each figure are not necessarily shown in proper proportion.

DESCRIPTION OF PREFERRED
EMBODIMENTS

Figure 1:
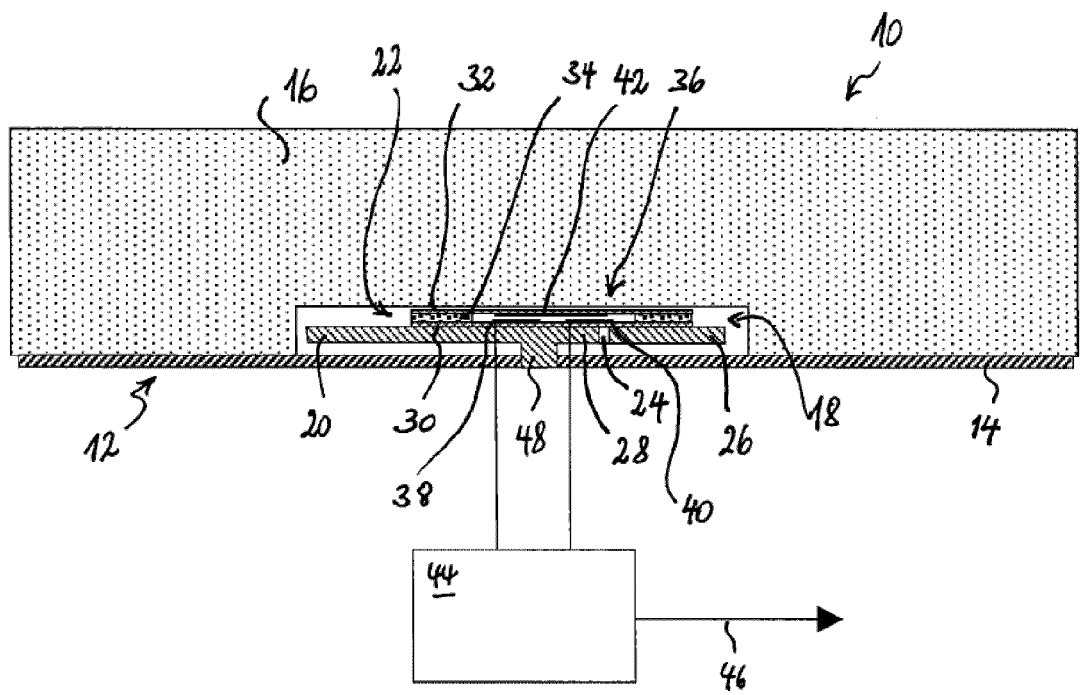
FIG. 1 is a schematic cross sectional view of a vehicle seat including a seat suspension mat according to a first preferred embodiment of the invention in unloaded condition (empty seat)
Figure 2:
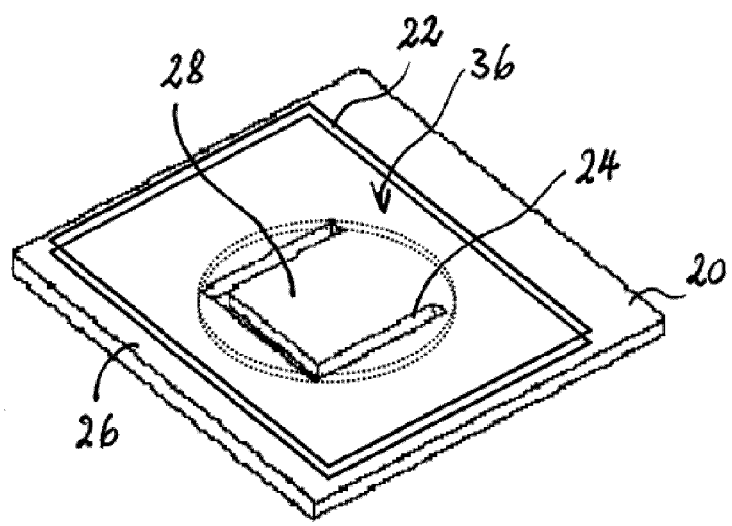
FIG. 2 is a schematic perspective view of the pressure sensor module of the embodiment of FIG. 1.
Figure 3:
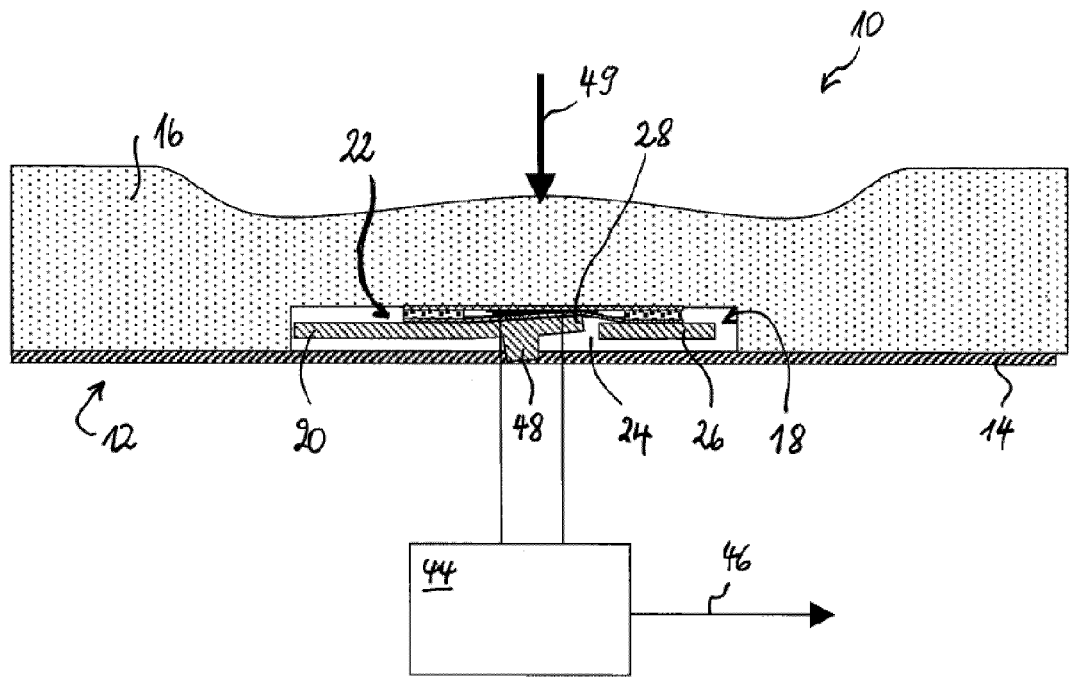
FIG. 3 is a schematic cross sectional view of the vehicle seat of FIG. 1 in loaded condition (occupied seat)

A first preferred embodiment of the invention is illustrated in FIGS. 1-3. FIGS. 1 and 3 schematically show a vehicle seat 10 that comprises a vehicle seat suspension mat 12 according to the first preferred embodiment. The vehicle seat suspension mat 12 comprises a plurality of suspension springs 14 taut between fixation sites of a structural frame (not shown) of the vehicle seat 10 to support a seat cushion 16. The vehicle seat suspension mat 12 is equipped with a pressure sensor module 18 configured to detect the occupancy state of the vehicle seat 10 (e.g. "empty" or "occupied").

The pressure sensor module 18 comprises a base plate 20 having a film-type pressure sensor 22 arranged thereon.

The film-type pressure sensor 22 comprises a first carrier film 30 and a second carrier film 32 spaced from each other by an intermediate spacer film 34. The spacer film 34 has an opening therein that defines a pressure-sensitive cell 36 in which the carrier films 30, 32 are brought closer together when the pressure sensor 22 is put under pressure. A first electrode 38 and a second electrode 40 are arranged on the first carrier film 30 in facing relationship with a third electrode 42 on the second carrier film 32 in such a way that they are brought into electrical contact with each other when pressure is applied on the pressure sensor 22. The first and second electrodes 38, 40 are connected to an evaluation circuit 44 (implemented, for instance, as an application-specific integrated circuit, a microcontroller or the like), which is configured to detect whether the electrodes 38, 40, 42 are in contact with one another and, therefore, whether the load on the seat 10 exceeds a certain pressure threshold or not. The evaluation circuit 44 outputs a corresponding signal on an output 46.

As best shown in FIG. 2, the base plate 20 is divided by a generally U-shaped opening 24 into a frame portion 26 (at the periphery of the base plate 20) and an actuator portion 28. The actuator 28 is thus linked to the frame 26 in a cantilevered manner, whereby it is enabled of limited movement out of the plane of the frame 26. The base plate 20 is preferably made of one piece, e.g. injection-molded plastic. The pressure sensor 22 is disposed on the base plate 20 in such a way that the pressure-sensitive cell 36 (indicated by the dotted lines in FIG. 2) lies above the actuator 28.

The base plate 20 is mounted on the suspension spring 14 by a fixation element 48 arranged on the bottom side of the actuator 28. The fixation element 48 (e.g. a clip or a clamp) is configured such that it provides for a spacing between the bottom of the base plate 20 and the suspension spring 14. The suspension spring 14 applies the pressure sensor module 18 against the bottom surface of the seat cushion 16. When the seat 10 is loaded (illustrated by arrow 49 in FIG. 3), the cushion 16 is compressed, whereby the pressure sensor module 18 as a whole is pushed downward. At the same time, the suspension spring 14 provides the reaction force via the fixation element 48. That causes a shearing movement between the actuator 28 and the frame 26, i.e. the actuator 28 is pushed upward relative to the frame 26. As a result, the actuator 28 urges the first carrier film 30 of the film-type pressure sensor towards the second carrier film 32 (see FIG. 3).

As those skilled will appreciate, the mechanical parameters of the base plate 20 (stiffness, modulus of elasticity, thickness, size and shape of the actuator, etc.) can be adjusted to achieve a desired activation pressure or force, i.e. pressure or force above which the seat is considered occupied.

In the embodiment of the invention illustrated in FIGS. 1-3, the seat cushion 16 comprises a recess at its bottom side for accommodation of the pressure sensor module 18. It should be noted, however, that such a recess may not be necessary in all embodiments of the invention, in particular if the pressure sensor module is of very thin execution or if the suspension springs 14 comprise a portion that is recessed from the bottom surface of the cushion 16.

Figure 4:
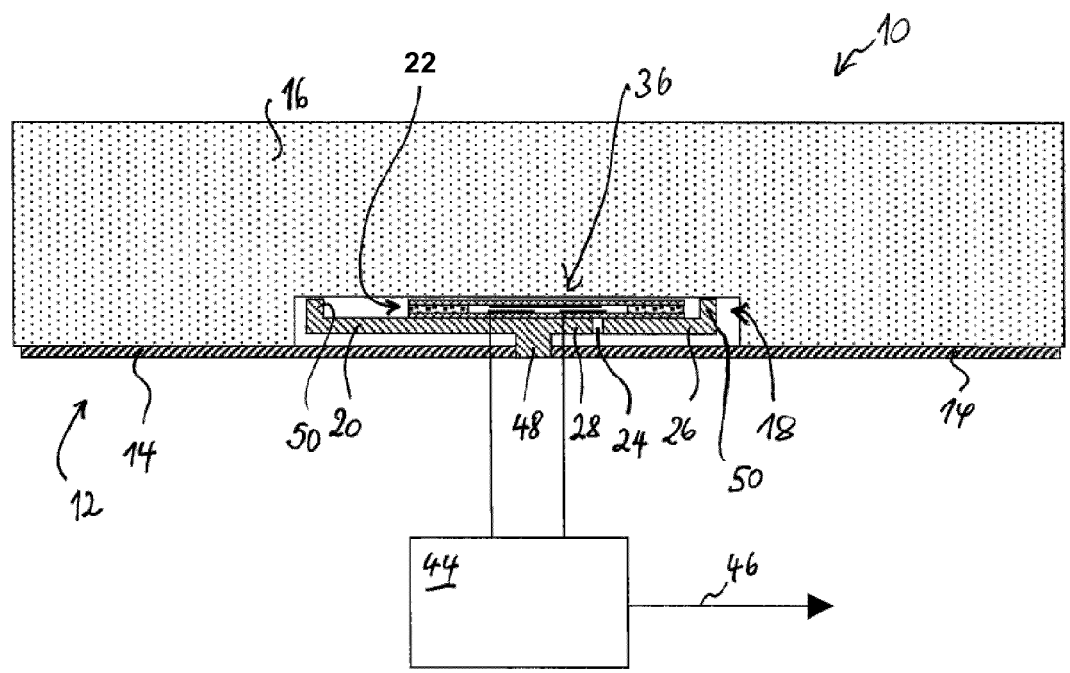
FIG. 4 is a schematic cross sectional view of a vehicle seat including a seat suspension mat according to a variant of the first preferred embodiment of the invention.
Figure 5:
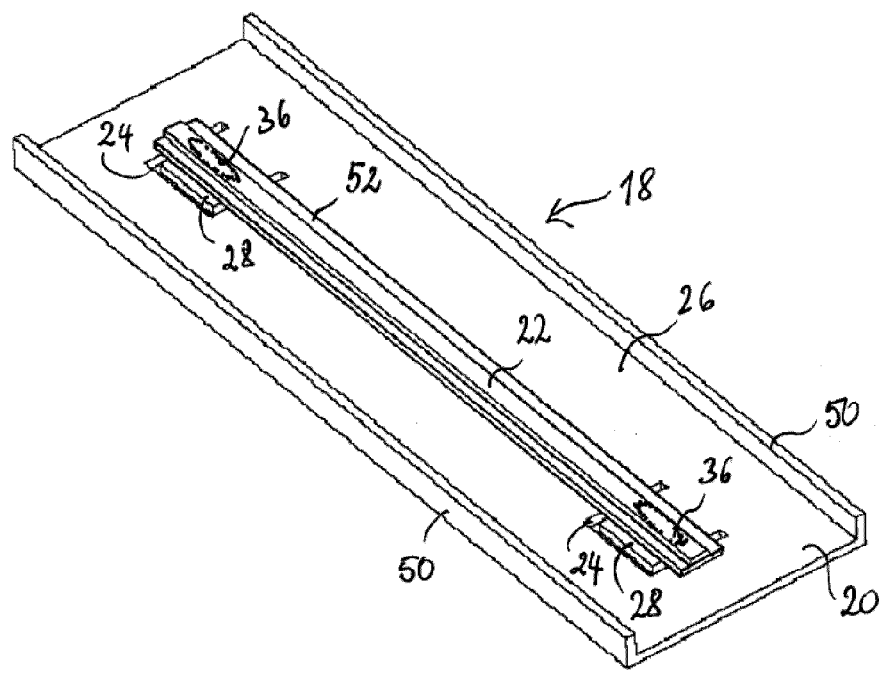
FIG. 5 is a perspective view of a pressure sensor module according to a second embodiment of the invention.

FIG. 4 shows a variant of the embodiment illustrated in FIGS. 1-3. The sole difference resides in the presence of spacers 50 arranged at the periphery of the base plate 20. The spacers 50 delimit a region, which the film-type pressure sensor 22 is arranged in. The spacers 50 maintain the pressure sensor 22 at a small distance from the bottom surface of the seat cushion 16 when the seat is unloaded. This configuration of the base plate 20 avoids difficultly controllable pre-load on the pressure sensor 22. When the seat is occupied, the seat cushion 16 is compressed and part of the cushion 16 penetrates into the region between the spacers 50. In respect of any other property of the seat suspension mat shown in FIG. 4, the reader is referred to the description of the embodiment of FIGS. 1-3.

FIGS. 5-8 illustrate pressure sensor modules 18 according to further preferred embodiments of the invention. The pressure sensor module of FIG. 5 comprises a substantially rectangular base plate 20 with spacers 50 extending on the long edge of the rectangle. The base plate 20 comprises two generally U-shaped openings 24 defining each an actuator 28 as described hereinabove. The base plate 20 carries a film-type pressure sensor 22, which is arranged on an intermediate layer of a compressible material 52 (e.g. a polyurethane or other foam layer). The intermediate layer of compressible material 52 helps to introduce the compressive forces into the pressure-sensitive cells 36, which are disposed above the actuators 28.

Figure 6:
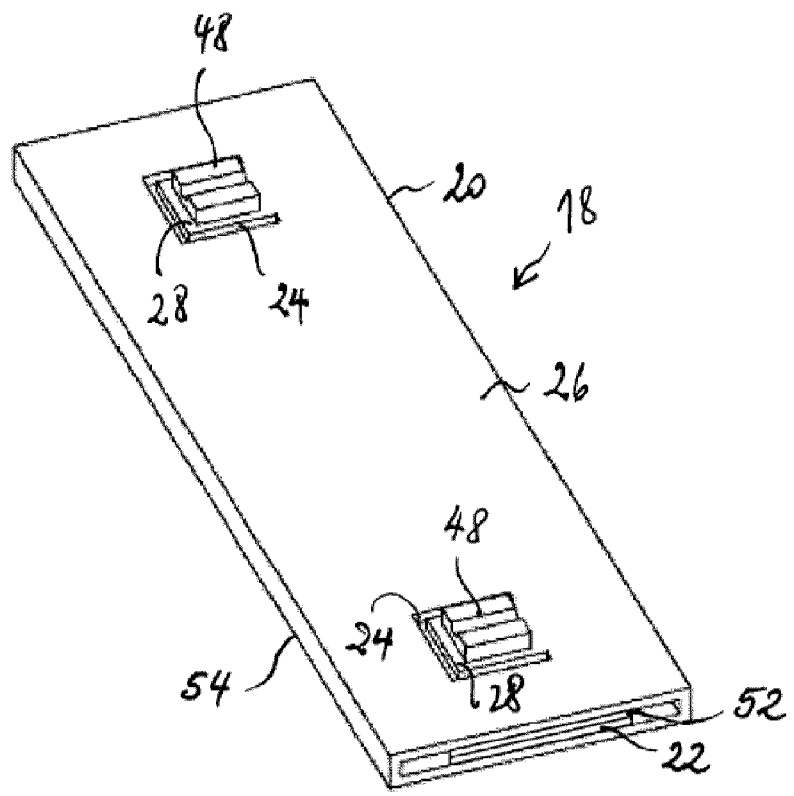
FIG. 6 is a perspective view of a pressure sensor module according to a third embodiment of the invention.
Figure 7:
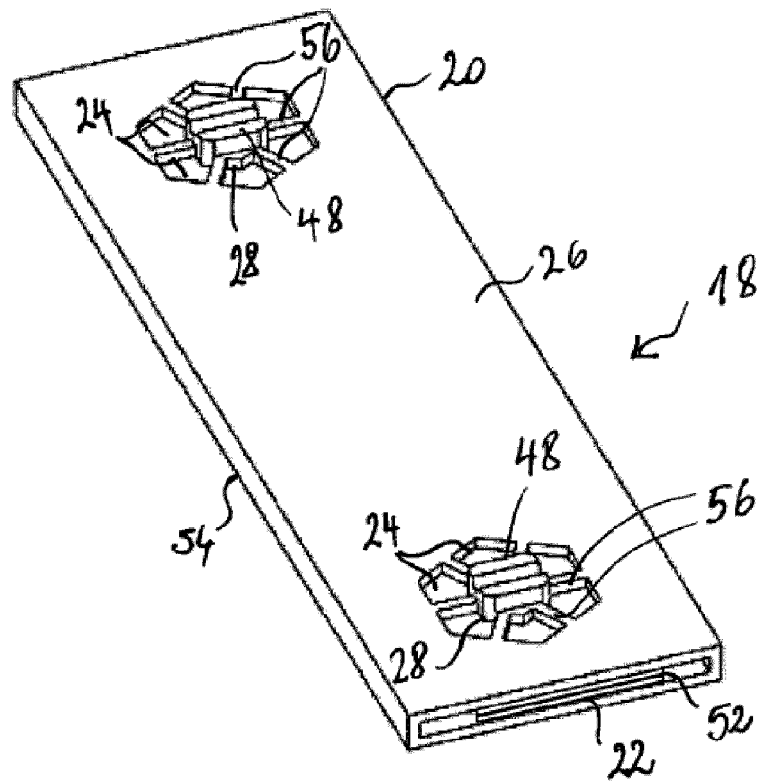
FIG. 7 is a perspective view of a pressure sensor module according to a fourth embodiment of the invention.
Figure 8:
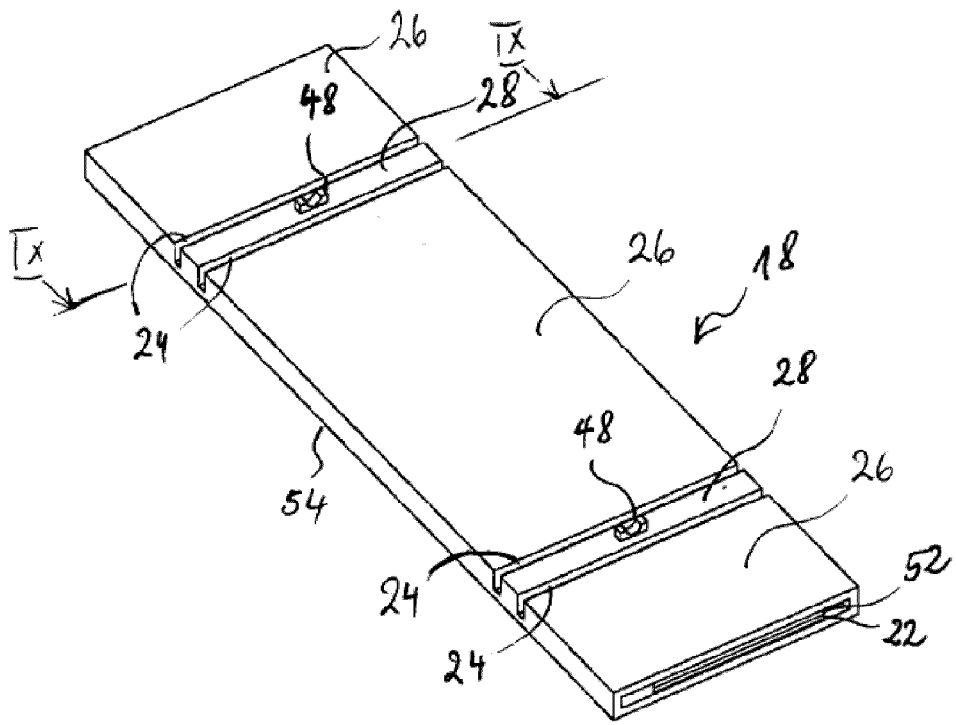
FIG. 8 is a perspective view of a pressure sensor module according to a fifth embodiment of the invention.

FIG. 6-8 relate to pressure sensor modules 18 comprising a casing 54, of which the base plate 20 forms the bottom. According to these embodiments, the film-type pressure sensor 22 is surrounded by the casing 54. As a consequence, the pressure sensor 22 is protected against the application of pressure from the seat cushion 16. Pressure is applied on the pressure-sensitive cells via the actuators 28.

As illustrated in FIGS. 6-8, the actuators may be of different configurations.

FIG. 6 shows actuators 28 that are essentially configured as cantilevered flaps, already discussed in relation with the embodiments of FIGS. 1-5.

In the embodiment of FIG. 7, the actuators 28 are linked to the frame 26 by a plurality of webs 56. In comparison with the surrounding frame 26, the webs 56 are significantly weaker, which means that they may bend when the pressure-sensor module 18 is subjected to compression by the suspension springs 14 and the cushion 16. In consequence, the actuators 28 may move out of the plane of the base plate 20 and thus transfer pressure onto the pressure-sensing cells 36 of the film-type pressure sensor 22.

In the embodiment of FIG. 8, the actuators 28 are strip-shaped and span the entire width of the base plate 20. Each of the actuators is linked to the frame 26 at both of its ends.

Figure 9:
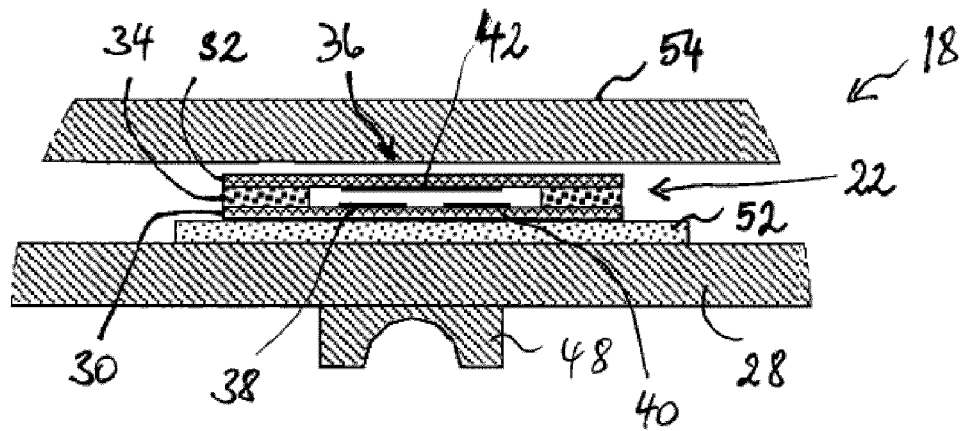
FIG. 9 is a cross-sectional view of a detail of the pressure sensor module of FIG. 8.

FIG. 9 shows a detail of the pressure sensor module 18 of FIG. 8 in cross-section. When the seat is occupied, the pressure sensor module is compressed between the cushion and the suspension spring (not shown in FIG. 9). The actuator 28 thus moves upward with respect to the frame 26 and compresses the intermediate foam layer 52. The intermediate foam layer 52, in turn, transfers the pressure onto the pressure-sensitive cell 36 of the film-type pressure sensor 22.

Figure 10:
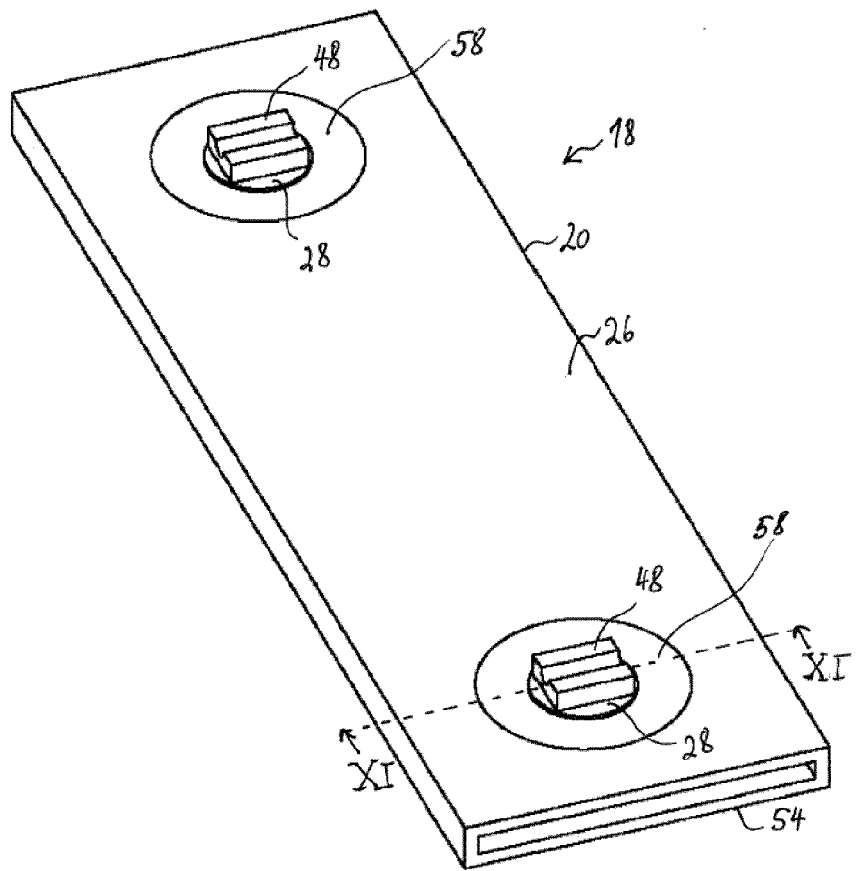
FIG. 10 is a perspective view of the pressure sensor module according to a sixth embodiment of the invention.
Figure 11:
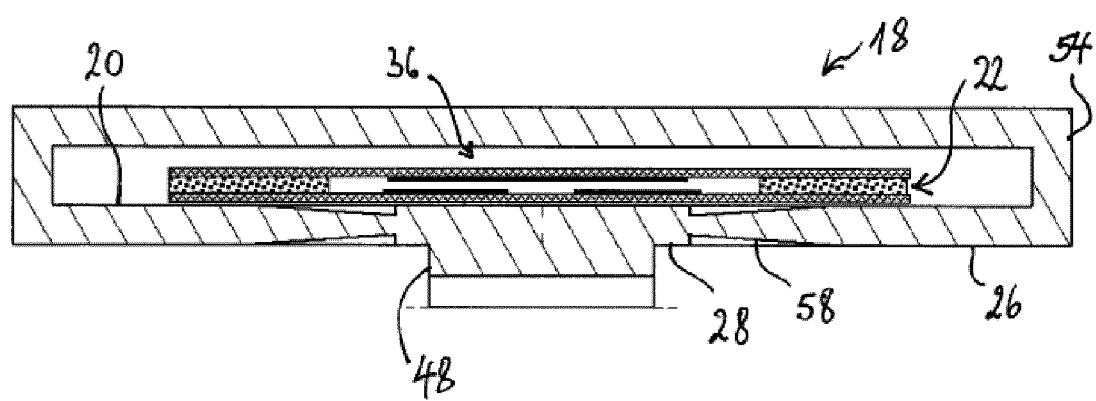
FIG. 11 is a cross sectional view of the pressure sensor module of FIG. 10.

FIGS. 10 and 11 illustrate a pressure sensor module 18 according to yet another preferred embodiment of the invention. According to this embodiment, each of the actuators 28 is linked to the frame 26 by a weakened zone 58. The weakened zones 58 have a reduced thickness in comparison with the frame 26. Therefore, the weakened zones 58 act as a membrane spring when the pressure-sensor module 18 is subjected to compression by the suspension springs and the cushion (not shown in FIGS. 10 and 11). In consequence, the actuators 28 may move out of the plane of the base plate 20 and thus transfer pressure onto the pressure-sensing cells 36 of the film-type pressure sensor 22. The base plate 20, including the frame portion 26, the actuator portions 28 and the weakened zones 58 is preferably made of a single piece of material, e.g. injection-molded plastic.

While specific embodiments have been described in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A vehicle seat suspension mat, comprising
one or more suspension springs for supporting a seat cushion, and
a pressure sensor module arranged on said one or more suspension springs for being applied against a bottom surface of said seat cushion, said pressure sensor module being configured for producing an electrical signal responsive to pressure acting on said pressure sensor module;
wherein said pressure sensor module comprises a base plate and a film-type pressure sensor arranged on said base plate, said film-type pressure sensor including a pressure-sensitive cell;
wherein said base plate comprises a frame and an actuator, said actuator being linked to said frame in such a way that said actuator is capable of movement relative to said frame;
wherein said actuator is arranged against said pressure-sensitive cell of said film-type pressure sensor; and
wherein said actuator comprises a fixation element fixing said base plate to said one or more suspension springs, said fixation element spacing said base plate from said one or more suspension springs.

2. The vehicle seat suspension mat as claimed in claim 1, wherein said actuator is linked to said frame in a cantilevered manner.

3. The vehicle seat suspension mat as claimed in claim 1, wherein said actuator comprises a first and a second end and is linked to said frame at said first and second ends.

4. The vehicle seat suspension mat as claimed in claim 1, wherein said actuator is linked to said frame by a plurality of webs.

5. The vehicle seat suspension mat as claimed in claim 1, wherein said actuator is linked to said frame by a weakened zone.

6. The vehicle seat suspension mat as claimed in claim 1, wherein said actuator and said frame are made of one piece of material.

7. The vehicle seat suspension mat as claimed in claim 1, wherein said base plate comprises one or more spacers arranged at a periphery of said film-type pressure sensor, said one or more spacers defining between one another a region into which said seat cushion may penetrate when loaded so as to come to lie against said film-type pressure sensor.

8. The vehicle seat suspension mat as claimed in claim 1, wherein said pressure sensor module comprises a casing accommodating said film-type pressure sensor in its interior, said casing comprising said base plate as a bottom plate.

9. The vehicle seat suspension mat as claimed in claim 8, wherein said casing is made of a single piece of material.

10. The vehicle seat suspension mat as claimed claim 1, wherein said fixation element comprises a clip or a clamp.

11. The vehicle seat suspension mat as claimed in claim 1, wherein said pressure sensor module comprises a compressible intermediate layer arranged between said film-type pressure sensor and said base plate.

12. A pressure sensor module for a vehicle seat suspension mat, comprising:
a base plate and
a film-type pressure sensor arranged on said base plate, said pressure sensor including a pressure-sensitive cell;

wherein said base plate comprises a frame and an actuator, said actuator being linked to said frame in such a way that said actuator (28) is capable of movement relative to said frame;

wherein said actuator is arranged against said pressure-sensitive cell of said film-type pressure sensor; and wherein said actuator comprises a fixation element for fixing said base plate to one or more suspension springs of said vehicle seat suspension mat, said fixation element being configured so as to provide a spacing between said base plate and said at least one suspension spring.

13. A device as claimed in claim 1, wherein said film-type pressure sensor comprises a first carrier film and a second carrier film spaced from each other by a spacer film, said spacer film having therein an opening defining said pressure-sensitive cell, said film-type pressure sensor comprising at least two electrodes arranged in facing relationship with each other in said cell on said first and said second carrier film, respectively, in such a way that said at least two electrodes are brought closer together when pressure is applied on said film-type pressure sensor.

14. A device as claimed in claim 12, wherein said film-type pressure sensor comprises a first carrier film and a second carrier film spaced from each other by a spacer film, said spacer film having therein an opening defining said pressure-sensitive cell, said film-type pressure sensor comprising at least two electrodes arranged in facing relationship with each other in said cell on said first and said second carrier film, respectively, in such a way that said at least two electrodes are brought closer together when pressure is applied on said film-type pressure sensor.

\* \* \* \* \*